(12) United States Patent
Muntasser

(10) Patent No.: US 10,068,438 B2
(45) Date of Patent: Sep. 4, 2018

(54) L-STYLE MARKING CLAMP

(71) Applicant: Emadeddin Zahri Muntasser, Braintree, MA (US)

(72) Inventor: Emadeddin Zahri Muntasser, Braintree, MA (US)

( * ) Notice: Subject to any disclaimer, the term of this patent is extended or adjusted under 35 U.S.C. 154(b) by 212 days.

(21) Appl. No.: 14/823,311

(22) Filed: Aug. 11, 2015

(65) Prior Publication Data

US 2017/0046927 A1    Feb. 16, 2017

(51) Int. Cl.
   *G08B 5/02*    (2006.01)
   *F16B 1/00*    (2006.01)
   *F16B 2/10*    (2006.01)

(52) U.S. Cl.
   CPC .............. *G08B 5/02* (2013.01); *F16B 1/0071* (2013.01); *F16B 2/10* (2013.01)

(58) Field of Classification Search
   CPC .................................. G08B 5/02; F16B 2/10
   USPC ..... 116/200, 209; 269/95–101, 3, 6; 81/342, 81/367–368, 318, 326, 327, 329, 334, 81/341; 248/229.13, 229.14, 229.23, 248/229.24, 229.5, 229.51, 229.6, 229.61, 248/229.65
   See application file for complete search history.

(56) References Cited

U.S. PATENT DOCUMENTS

| | | | | |
|---|---|---|---|---|
| 29,623 A * | 8/1860 | Russell | ................ | B25B 13/14 24/135 R |
| 290,277 A * | 12/1883 | Small | ................ | B66F 3/08 254/126 |
| 460,438 A * | 9/1891 | Haunty | ................ | B25B 7/22 254/26 R |
| 520,896 A * | 6/1894 | Porter | ................ | B26B 17/02 30/193 |
| 522,471 A * | 7/1894 | Kohler | ................ | B25B 7/02 30/101 |
| 600,504 A * | 3/1898 | Autio | ................ | B25B 33/00 140/123.5 |
| 689,434 A * | 12/1901 | Theobald | ................ | B25B 1/2484 248/228.8 |
| 924,357 A * | 6/1909 | Irwin | ................ | H02G 1/1229 30/90.6 |
| 946,074 A * | 1/1910 | Seessle | ................ | H02G 1/1229 30/90.6 |
| 1,027,693 A * | 5/1912 | Collister | ................ | B25B 13/28 81/326 |
| 1,094,400 A * | 4/1914 | Burgess | ................ | B25B 5/107 269/165 |

(Continued)

FOREIGN PATENT DOCUMENTS

| WO | 2013009075 | 1/2013 |
|---|---|---|
| WO | 2013141514 | 9/2013 |
| WO | 2014126465 | 8/2014 |

OTHER PUBLICATIONS

U.S. Appl. No. 14/867,097 Non-Final Office Action dated Apr. 20, 2017.

*Primary Examiner* — R. A. Smith
*Assistant Examiner* — Tania Courson
(74) *Attorney, Agent, or Firm* — Lambert & Associates; Gary E. Lambert; David J. Connaughton, Jr.

(57) ABSTRACT

A clamp assembly is provided. The clamp assembly is configured to be able to clamp to a buried or buryable element. A marker extends away from the clamp to allow visual indication that there is a buried element below the burying material.

13 Claims, 5 Drawing Sheets

(56) References Cited

U.S. PATENT DOCUMENTS

| | | | |
|---|---|---|---|
| 1,190,031 A * | 7/1916 | Spalding | B25B 5/10 81/319 |
| 1,219,160 A * | 3/1917 | Rosenblatt | G02C 13/001 72/409.17 |
| 1,406,106 A * | 2/1922 | Thueringer | B25B 13/14 30/185 |
| 2,057,201 A | 10/1936 | McCluskey | |
| 2,409,627 A * | 10/1946 | Helgeson | B25B 7/10 81/321 |
| 2,433,550 A | 12/1947 | Graham | |
| 2,454,309 A * | 11/1948 | Davis | B25B 7/12 269/211 |
| 3,262,414 A * | 7/1966 | Monk | G09F 17/00 116/173 |
| 3,379,079 A * | 4/1968 | Cutter | B25B 7/123 81/367 |
| 3,609,638 A | 9/1971 | Darrey | |
| 4,403,459 A | 9/1983 | Hurlbut | |
| 4,519,278 A | 5/1985 | Heldt | |
| 4,921,234 A | 5/1990 | Peterson | |
| 5,289,746 A * | 3/1994 | Finn | B25B 13/26 81/126 |
| 5,765,822 A | 6/1998 | Mead | |
| 5,976,133 A | 11/1999 | Kraus et al. | |
| 5,979,355 A * | 11/1999 | LeBlanc | B60Q 7/02 116/173 |
| 6,185,771 B1 | 2/2001 | Trusty, Sr. | |
| 6,199,458 B1 * | 3/2001 | Wrigley | B25B 7/123 81/319 |
| 6,254,040 B1 | 7/2001 | McGrath | |
| 6,279,433 B1 | 8/2001 | Chervenak | |
| 6,412,767 B1 | 7/2002 | Beckmann et al. | |
| 6,993,999 B2 * | 2/2006 | Wong | B25B 7/02 81/302 |
| 7,618,417 B2 | 11/2009 | Thomke et al. | |
| 7,694,641 B2 | 4/2010 | Lockhart | |
| 7,891,713 B2 | 2/2011 | Bekkevold | |
| 8,001,872 B2 * | 8/2011 | Gorrie | B67B 7/18 269/3 |
| 8,607,725 B2 * | 12/2013 | Degirmenci | A63B 71/0672 116/222 |
| 8,707,833 B1 | 4/2014 | Gedeon | |
| 2001/0054335 A1 * | 12/2001 | Harman | B25B 7/123 81/367 |
| 2002/0152948 A1 * | 10/2002 | Percle | G09F 3/16 116/209 |
| 2004/0055429 A1 * | 3/2004 | Winkler | B25B 7/02 81/367 |
| 2004/0163458 A1 * | 8/2004 | Lapkin | A63B 57/00 73/170.05 |
| 2007/0181052 A1 * | 8/2007 | Deichman | B60Q 1/30 116/30 |
| 2009/0165698 A1 * | 7/2009 | Lapkin | G09F 17/00 116/173 |
| 2011/0175270 A1 * | 7/2011 | Hagan | B25B 5/12 269/6 |
| 2014/0026722 A1 | 1/2014 | Chen | |
| 2014/0265086 A1 * | 9/2014 | Albin | B25B 5/068 269/6 |
| 2016/0059389 A1 * | 3/2016 | Siegmund | B25B 5/10 269/100 |
| 2017/0089512 A1 * | 3/2017 | Muntasser | F16B 2/12 |

* cited by examiner

L-STYLE MARKING CLAMP

BACKGROUND OF THE INVENTION

Field of the Invention

The present invention relates generally to marking devices. More particularly, the present invention relates to a clamp having a receiving area for a marker that can extend through snow, or other coverings, to identify what is beneath.

Description of Related Art

During heavy snow fall, it is common for structural elements such as pipes, housings, access panels, wiring, components, skylights, and the like to be buried. This burying can be caused by falling leaves, snow, soil, other debris, and the like. When buried, these items may become damaged, often substantially, if they cannot be seen. This damage may come from, for example, snow removal devices like shovels, blowers, or plows, or by other tools such as rakes, and the like. Contractors and workers making repairs to roofs or fixtures or shoveling snow can trip on these obstructions or even fall to their death through skylights that can be covered with snow. Punctured gas pipes are a major safety and fire hazard.

Therefore, what is needed is a device that may be quickly and easily attached to these potentially buryable structural elements to extend through any burying material to mark that the structural elements are below.

SUMMARY OF THE INVENTION

The subject matter of this application may involve, in some cases, interrelated products, alternative solutions to a particular problem, and/or a plurality of different uses of a single system or article.

In one aspect, a clamp assembly is provided. The clamp assembly may comprise a clamp and a marker extending away from the clamp. The clamp may have two arms hingedly connected by a hinge. These arms can form a clamping end at a proximal end on one side of the hinge, and may extend beyond the opposite side of the hinge at their distal ends. At least one, and often both of the two arms define a marker receiving region near their distal end. The marker is removably attached or otherwise held in place to the marker receiving region at its proximal end, with its distal end extending away from the clamp.

In another aspect, a clamp assembly is provided. The clamp assembly has a clamp engaged with a buryable element, and has a marker extending from the clamp away from the buryable element. The clamp may have two arms hingedly connected by a hinge. These arms can form a clamping end at a proximal end on one side of the hinge, and extend beyond the opposite side of the hinge at their distal ends. At least one, and often both of the two arms define a marker receiving region near their distal end. The clamping end is removably engaged in place to the buryable element. At least one, and often both, of the two arms define a marker receiving region near their distal end. The marker is removably attached or otherwise held in place to the marker receiving region at its proximal end, with its distal end extending away from both the clamp and the buryable element.

DETAILED DESCRIPTION

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a clamp and marker assembly configured to be removably clamped or otherwise attached to a buried element, with the marker extending out of the burying material. In one embodiment, the clamp may have extended regions, such as extended handles that are configured to removably receive the marker. In a particular embodiment, the extended regions may be flexible, to be moved into various positions depending on the orientation of the buried element that the clamp is intended to be connected to. As such, the marker may be able to extend out of the burying material at multiple different angles and directions. However, it should be understood that the present invention may have any number of structures to achieve a similar function, such as an embodiment having an extension from the clamp to removably receive the marker that is not a handle.

Figure 1:
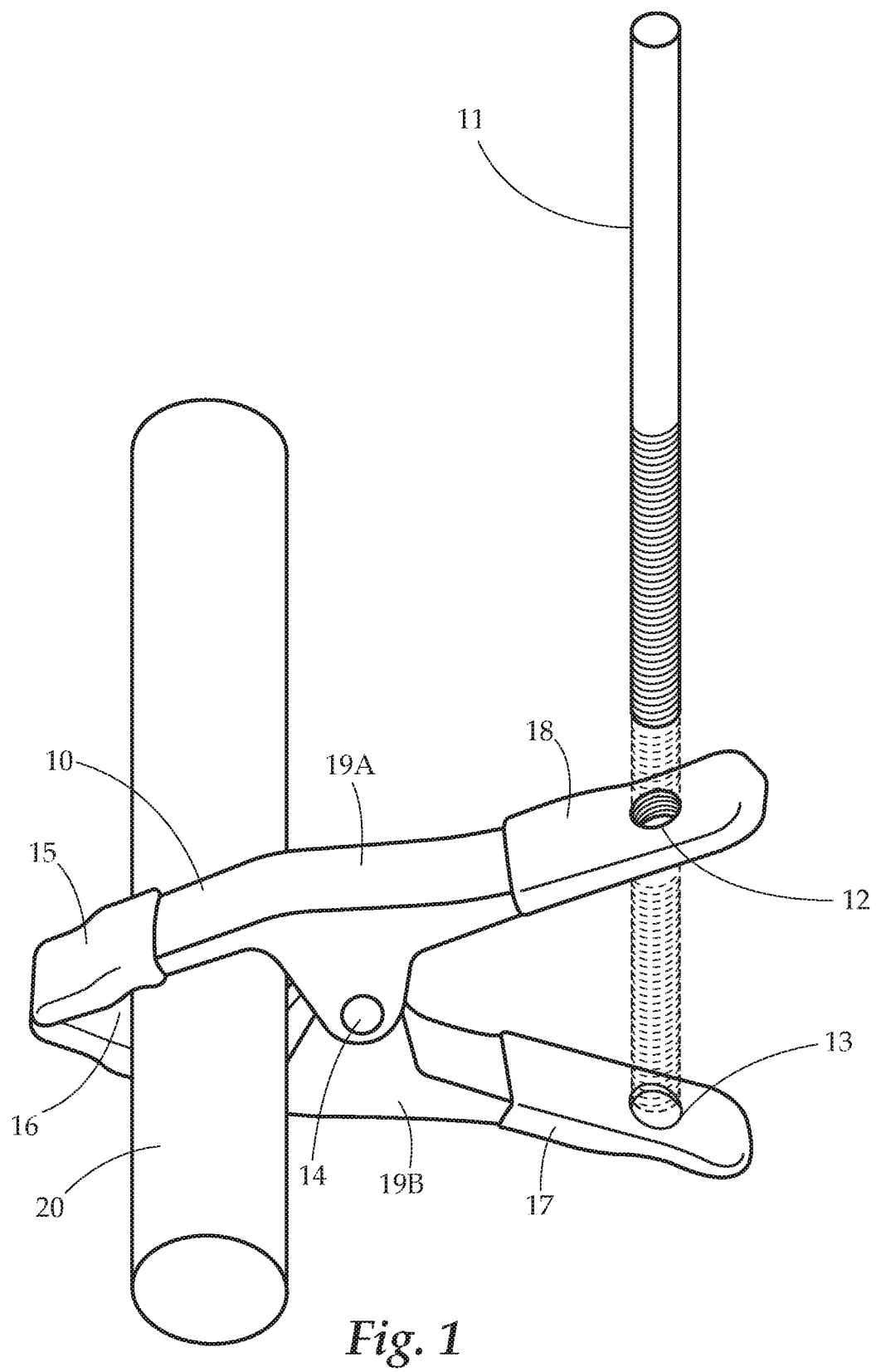
FIG. 1 provides a perspective view of an embodiment of the clamp assembly of the present invention.

Turning now to FIG. 1, one embodiment of the present invention clamp assembly is provided. The clamp 10 has two arms 19a and 19b hingedly attached at hinge 14. Clamping end 15 defines a region 16 to receive the element to be clamped. This clamping end can be opened and closed by movement of the arms 19a and 19b about hinge 14. The arms are biased in the closed position by a spring or other force element (not shown). On the ends of the arms 19a and 19b opposite to the clamping end are the extensions 17 and 18. Extensions extend away from the clamp 10.

Typically, these extensions 17 and 18 are permanently shaped formed at manufacture to be a particular orientation. However, in some embodiments, one or both extensions 17, 18 may be flexible. In such an embodiment, the extensions may move as needed to allow a marker 11 to extend away from the clamp in multiple different directions and orientations relative to the arms 19a, 19b.

A marker 11 is shown herein as an elongate shaft but may be any sort of marking structure capable of extending away from the clamp 10. The marker 11 is removably attachable to one or both of the extensions 17, 18. In one embodiment, the marker 11 may be attached to and/or through marker receiving regions 12 and 13. For example, the marker 11 may be threaded and the region 12, 13 may be similarly threaded to receive the marker 11. In other embodiments, only one of the regions 12, 13 may be threaded, with the other being one of a non-threaded aperture, and a seat, among other configurations. In other embodiments, the marker 11 and regions 12, 13, may be non-threaded, and may attach to at least one of the regions 12, 13 in any manner, such as by frictional tension between the clamp arms and the marker; or by an ear clamp, tab, or other similar structure permanently or removably connected to the marker that can hold it in place.

In a particular embodiment, regions 12, 13, may be formed as non-threaded apertures. An angling of the arms 19a, 19b relative to each other may allow the apertures to frictionally hold the marker 11 in place by applying a force against the marker 11 by the aperture walls. This may be aided by a spring biasing the arms 19a, 19b apart from each other at their distal ends. Upon a squeezing of the arms towards each at the distal end, the force against the marker will diminish as the aperture walls approach a parallel alignment with each other, allowing for release of the marker. This embodiment of marker receiving region may similarly apply to any other clamp embodiment as taught herein.

Further still, it should be understood that the marker 11 need not be attached to at least one of the extensions 18, 19 through a region at all. Indeed the marker 11 may connect to the clamp in any manner without straying from the scope of the present invention.

The marker 11 selected herein should be configured to be long enough to extend outward from the clamp sufficiently to extend beyond a surface of the burying material. For example, if the clamp 10 is attached to a pipe 20 on a roof, and up to three feet of snow may be expected to accumulate over a period of time, the marker 11 should have a length of greater than three feet. Similarly, if the clamp 10 is attached to an underground element buried eight inches under the soil, the marker 11 should be greater than eight inches long. Further embodiments of the marker 11 include a flag at a distal end, bright colored markings, signs, and the like.

Figure 2:
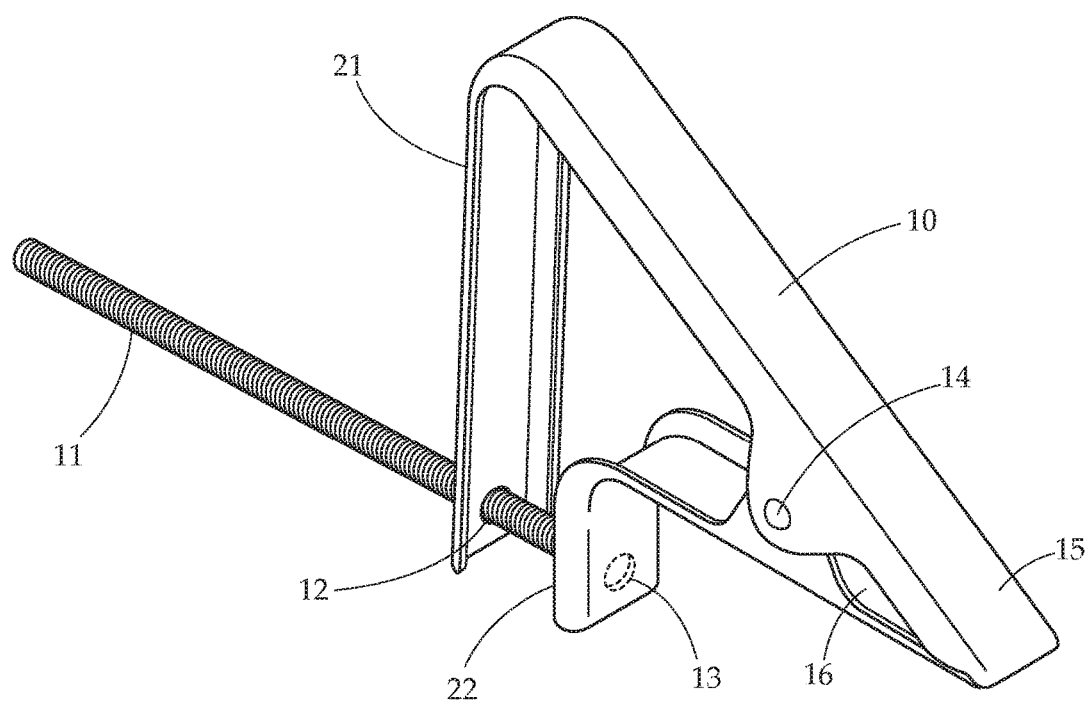
FIG. 2 provides a perspective view of another embodiment of the clamp assembly of the present invention.

FIG. 2 shows another embodiment of the clamp of the present invention. In this embodiment, clamp 10 has arms 21, 22 that are hinged about hinge 14. At a proximal end of the arms 21, 22 they form a clamping end 15. Clamping end defines an open region 16 to receive the element to be clamped. This clamping end can be opened and closed by movement of the arms 19a and 19b about hinge 14. The arms 21, 22 are biased in the closed position by a spring or other force element (not shown).

Arm 21 extends along a straight line from the clamping end 15, and then makes an angled bend downward towards the opposing arm 22. Similarly, arm 22 extends along a straight line from the clamping end 15, and then makes an angled bend downward at approximately ninety degrees (though it should be understood that this angling may be in any direction). The angled bend of arm 22 is much shorter than the angled bend of arm 21 in order to ensure that the two arms have a distal end approximately aligned with each other.

A marker 11 is attached to the distal end of one or both of the arms 21, 22. The marker 11 extends away from the distal ends of the clamp 10. This marker 11, while shown as a threaded shaft, may be any structure capable of extending away from the distal end of the clamp. In the embodiment shown, arm 21 defines marker receiving region 12, while arm 22 defines marker receiving region 13. These regions 12, 13 may be apertures, threaded apertures, seats, or the like, and are generally configured to receive the marker 11. In one embodiment, the regions 12, 13 may have a first threaded aperture and a second seat, such that a threaded marker 11 may thread through the aperture until it reaches the seat where it will be supported. In another embodiment both regions 12, 13 may be threaded. With the threaded marker 11 being attachable to one or both regions 12, 13. In other embodiments, the marker 11 may be non-threaded, and may attach to at least one of the regions 12, 13 in any manner. Further still, it should be understood that the marker 11 need not be attached to at least one of the extensions 18, 19 through a region at all. Indeed the marker 11 may connect to the clamp in any manner without straying from the scope of the present invention.

Figure 3:
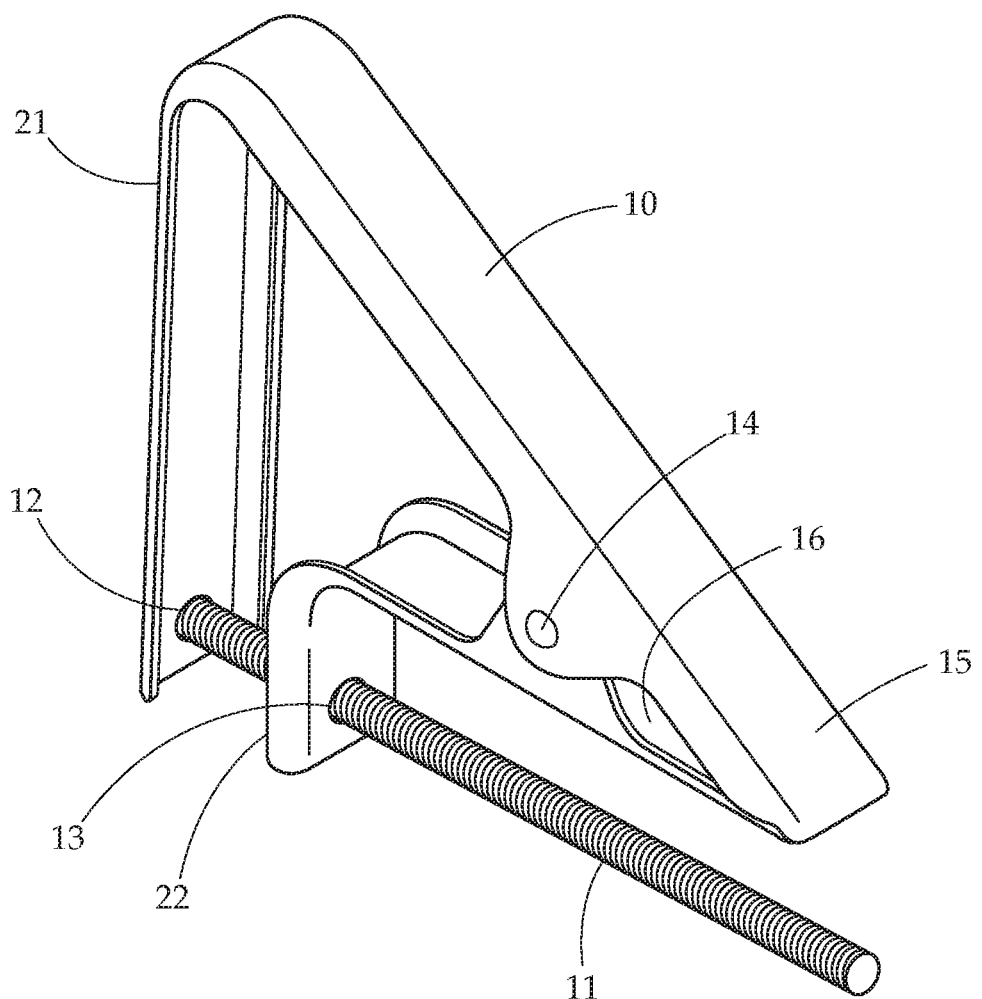
FIG. 3 provides a perspective view of still another embodiment of the clamp assembly of the present invention.

FIG. 3 provides another embodiment of the clamp of the present invention. In this embodiment, similarly to the embodiment of FIG. 2, clamp 10 has arms 21, 22, that are hinged about hinge 14. At a proximal end of the arms 21, 22, they form a clamping end 15. Clamping end 15 defines an open region 16 to receive the element to be clamped. This clamping end can be opened and closed by movement of the arms 19a and 19b about hinge 14. The arms 19a, 19b are biased in the closed position by a spring or other force element (not shown).

Arm 21 extends along a straight line from the clamping end 15, and then makes an angled bend downward towards the opposing arm 22. Similarly, arm 22 extends along a straight line from the clamping end 15, and then makes an angled bend downward at approximately ninety degrees (though it should be understood that this angling may be in any direction). The angled bend of arm 22 is much shorter than the angled bend of arm 21 in order to ensure that the two arms have a distal end approximately aligned with each other.

A marker 11 is attached to the distal end of one or both of the arms 21, 22. The marker extends towards the clamping end 15 and beyond it. This marker 11, while shown as a threaded shaft, may be any structure capable of extending away from the distal end of the clamp. In the embodiment shown, arm 21 defines region 12, while arm 22 defines region 13. These regions 12, 13 may be apertures, threaded apertures, seats, or the like, and are generally configured to receive the marker 11. As noted above, the marker 11 may be connected to the clamp in any manner without straying from the scope of the invention.

Figure 4:
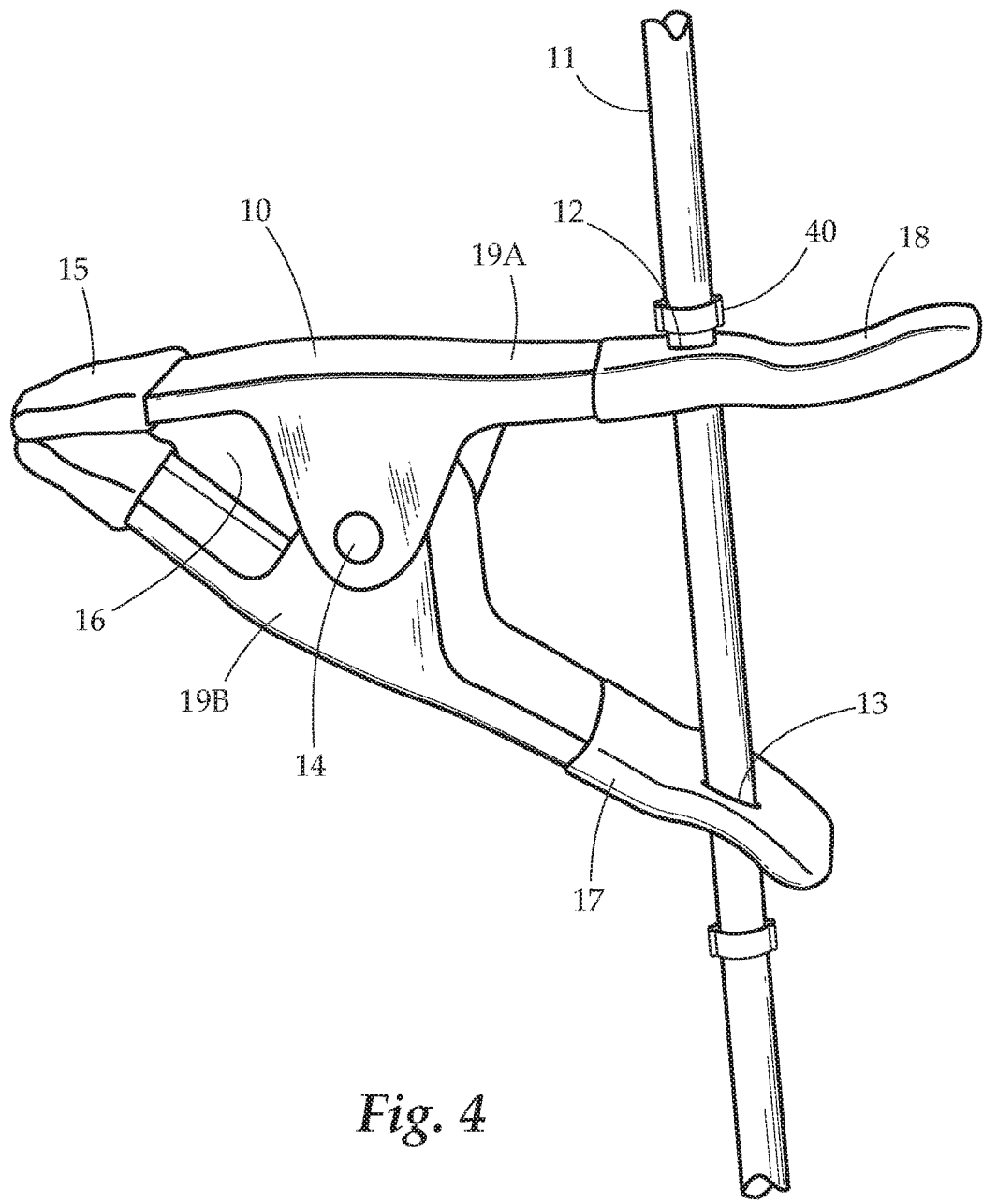
FIG. 4 provides a perspective view of yet still another embodiment of the clamp assembly of the present invention.

FIG. 4, provides another embodiment of the clamp of the present invention having the marker held in place by ear clamps. The clamp 10 has two arms 19a and 19b hingedly attached at hinge 14. Clamping end 15 defines a region 16 to receive the element to be clamped. This clamping end can be opened and closed by movement of the arms 19a and 19b about hinge 14. The arms are biased in the closed position by a spring or other force element (not shown). On the ends of the arms 19a and 19b opposite to the clamping end are the extensions 17 and 18. Extensions extend away from the clamp 10.

Figure 5:
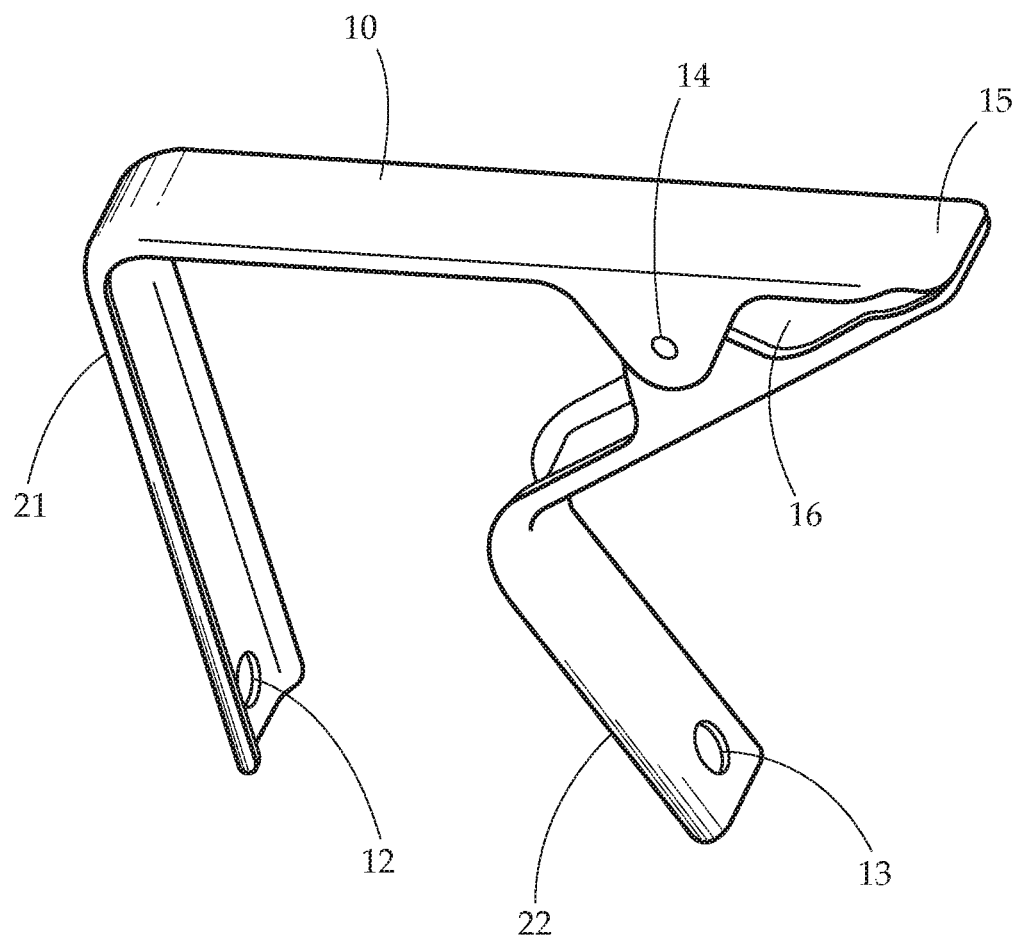
FIG. 5 provides a perspective view of yet another embodiment of the clamp assembly of the present invention.

FIG. 5 provides another embodiment of the clamp of the present invention that is similar to an embodiment of FIG. 3, with different angling of the arms 21, 22. In this embodiment, when a marker is passed through the apertures 12, 13, they will apply a force against the marker by a clamp spring (not shown) or other biasing force urging the arms 21, 22 apart. This force results in a frictional force being applied between the aperture 12, 13, walls and the marker.

Clamp 10 has arms 21, 22, that are hinged about hinge 14. At a proximal end of the arms 21, 22, they form a clamping end 15. Clamping end 15 defines an open region 16 to receive the element to be clamped. This clamping end can be opened and closed by movement of the arms about hinge 14. The arms are biased in the closed position by a spring or other force element (not shown).

Arm 21 extends along a straight line from the clamping end 15, and then makes an angled bend downward towards the opposing arm 22. This bend is shown as an approximately ninety degree bend, but may be at any angle. Similarly, arm 22 extends along a straight line from the clamping end 15, and then makes an angled bend downward. This bend is shown as approximately ninety degrees, though it should be understood that this angling may be in any direction or angle. The angled bend of arm 22 is shorter than the angled bend of arm 21 in order to ensure that the two arms have a distal end that can be approximately aligned with each other upon a squeezing of the clamp.

A marker 11 is shown herein as an elongate shaft but may be any sort of marking structure capable of extending away from the clamp 10. The marker 11 is removably attached both of the extensions 17, 18. In the embodiment shown, the marker 11 is attached by passing through marker receiving regions 12 and 13 and held in place using ear clamps 40. These clamps are frictionally held in place to the surface of the marker 11, and upon the application of a force can be slid off and adjusted.

The clamp of the present invention may be made of any material capable of supporting a marker, and capable of being resilient enough to clamp to a buried element. Examples of materials of which the clamp can be made include metals, plastics, composites, woods, synthetic materials, and the like. Similarly, the marker of the present invention may be made of any material capable of being attached to the clamp and capable of extending through a buried material. Examples of materials of which the marker can be made include metals, plastics, composites, woods, synthetic materials, and the like. It should be understood that the components of the present invention are not limited by material selection.

The clamp assembly of the present invention may be used in any manner to clamp to an element and have a marker extend away from the clamp. In many embodiments, the clamp may be used to clap to a buried (or to-be-buried) element, and oriented such that the extending marker can extend away from the burying material. For example, in one embodiment a piping on top of a roof may have a clap attached to it in the winter, in anticipation of a snow fall. Upon a snow fall, the pipe may be buried. However, the marker from the clamp will be extending past the snow layer. When snow must be removed from the roof, it will be easy for the remover to identify that there is some element buried below the snow. One of a plurality of clamps may be manually attached to these elements. At a later time, such as in the summer, the clamps may be removed when no longer needed. However, other uses of the assembly are certainly both possible and contemplated herein.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A clamp assembly comprising:
    a clamp, the clamp comprising:
        two arms hingedly connected by a hinge, the arms forming a clamping end at a proximal end on one side of the hinge, the arms extending beyond the opposite side of the hinge at their distal ends;
        wherein both of the two hingedly connected arms define a marker receiving region, each marker receiving region being an aperture, and wherein a marker formed as a shaft is passed through each aperture; and
    wherein each aperture is the same shape;
    wherein the marker is removably held in place at the marker receiving region at a proximal end, a distal end of the marker extending away from the clamp;
    wherein each of the two arms are bent in the same direction at their distal ends, and wherein the marker is passed through each marker receiving region at an end of each arm after the bend;
    wherein a first of the two arms is longer than a second of the two arms, and wherein the first longer arm is bent closer to a middle of its length, such that it has a longer region after the bend than the second arm, and wherein the distal ends of each arms are approximately aligned.

2. The clamp assembly of claim 1 wherein at least one of the two arms is flexible at the distal end, allowing the marker orientation to be adjusted by a flexing of the at least one of the two arms.

3. The clamp assembly of claim 1 wherein at least one receiving region is a threaded aperture, and wherein the marker is a threaded shaft configured to be threadedly received by the threaded aperture.

4. The clamp assembly of claim 1 further comprising a spring positioned proximal to the hinge, the spring biasing the two arms in a closed position such that they are contacting each other at the clamping region.

5. The clamp assembly of claim 1 wherein each aperture is the same size.

6. A clamp assembly comprising:
    a clamp, the clamp comprising:
        two arms hingedly connected by a hinge, the arms forming a clamping end at a proximal end on one side of the hinge, the arms extending beyond the opposite side of the hinge at their distal ends;
        wherein both of the two hingedly connected arms define a marker receiving region, each marker receiving region being an aperture, and wherein a marker formed as a shaft is passed through each aperture at a marker proximal end, a distal end of the marker extending away from the clamp; and
    wherein the clamping end is engaged with a buryable element, such that the marker is extending away from the buryable element.

7. The clamp assembly of claim 6 wherein each of the two arms are bent in the same direction at their distal ends, and wherein the marker is attached to the at least one of the two arms marker receiving region at an end of the at least one arm after the bend.

8. The clamp assembly of claim 6 wherein at least one of the two arms is flexible at the distal end, allowing the marker orientation to be adjusted by a flexing of the at least one of the two arms.

9. The clamp assembly of claim 6 wherein at least one receiving region is a threaded aperture, and wherein the marker is a threaded shaft configured to be threadedly received by the threaded aperture.

10. The clamp assembly of claim 6 wherein the buryable element is a pipe.

11. The clamp assembly of claim 6 wherein the marker is sized to extend beyond a maximum estimated snowfall amount over the buryable element.

12. The clamp assembly of claim 6 wherein the buryable element is on a building roof.

13. A clamp assembly comprising:
a clamp, the clamp comprising:
- two arms hingedly connected by a hinge, the arms forming a clamping end at a proximal end on one side of the hinge, the arms extending beyond the opposite side of the hinge at their distal ends;
- wherein both of the two hingedly connected arms define a marker receiving region, each marker receiving region being an aperture, and wherein a marker formed as a shaft is passed through each aperture; and
- wherein a first of the two arms is longer than a second of the two arms;
- wherein each of the two arms are bent in the same direction at their distal ends, the first longer arm is bent closer to a middle of its length, such that it has a longer region after the bend than the second arm, and wherein the distal ends of each arms are approximately aligned.

* * * * *